United States Patent
Bertini

(10) Patent No.: US 6,309,003 B1
(45) Date of Patent: Oct. 30, 2001

(54) POWER GRIPPER

(76) Inventor: Millo Bertini, 679 Garden St., Trumbull, CT (US) 06611

( * ) Notice: Subject to any disclaimer, the term of this patent is extended or adjusted under 35 U.S.C. 154(b) by 0 days.

(21) Appl. No.: 09/522,553

(22) Filed: Mar. 10, 2000

(51) Int. Cl.$^7$ .................................................. B25J 15/08
(52) U.S. Cl. ............................ 294/119.1; 294/88; 901/37
(58) Field of Search .................... 294/88, 119.1, 294/86.4; 901/31, 37, 49, 50; 269/25, 32, 33

(56) References Cited

U.S. PATENT DOCUMENTS

| | | | |
|---|---|---|---|
| 4,577,898 | * 3/1986 | Nusbaumer et al. | 294/88 |
| 4,593,948 | 6/1986 | Borcea et al. | 294/88 |
| 4,611,846 | * 9/1986 | Feiber et al. | 294/88 |
| 4,741,568 | 5/1988 | Borcea et al. | 294/88 |
| 4,874,194 | 10/1989 | Borcea et al. | 294/119.1 |
| 4,913,481 | * 4/1990 | Chin et al. | 294/119.1 |
| 5,125,708 | 6/1992 | Borcea et al. | 294/119.1 |
| 5,163,729 | 11/1992 | Borcea et al. | 294/119.1 |
| 5,529,359 | 6/1996 | Borcea et al. | 294/119.1 |
| 5,572,915 | 11/1996 | Bertini | 82/127 |
| 5,595,413 | * 1/1997 | McGeachy et al. | 294/88 |
| 5,620,223 | * 4/1997 | Mills | 294/88 |
| 5,639,136 | * 6/1997 | Rosengren et al. | 294/88 |
| 5,755,475 | * 5/1998 | Zajac, Jr. | 294/88 |
| 5,839,770 | * 11/1998 | Zajac, Jr. et al. | 294/88 |
| 5,967,581 | 10/1999 | Bertini | 294/119.1 |
| 6,003,431 | 12/1999 | Bertini | 92/30 |

* cited by examiner

Primary Examiner—Donald P. Walsh
Assistant Examiner—Paul T. Chin
(74) Attorney, Agent, or Firm—Fattibene & Fattibene; Arthur T. Fattibene; Paul A. Fattibene

(57) ABSTRACT

This disclosure is directed to a power gripper for use with a robotic tool that includes a housing having formed therein opposed pairs of piston and cylinder arrangements to effect the drive of a corresponding finger carrier slidably supported on each end of the housing for movement between and open and closed position. The respective finger carriers are slidably supported relative to the housing by a pair of diagonally disposed support shafts. Operatively connected to each of the respective finger carriers is a synchronizing shaft in meshing relationship with a pinion for synchronizing the movement of the respective carrier fingers between open and closed position. The arrangement is such that the synchronizing shafts are freely slidable within the housing and independent of the support shaft so as to be free of any sliding friction and/or bearing forces imparted to the support shafts during operation.

8 Claims, 5 Drawing Sheets

POWER GRIPPER

FIELD OF THE INVENTION

This invention is directed to a gripper assembly and more specifically to a power gripper having enhanced power transmission relative to the overall size or physical proportions of a gripper assembly.

BACKGROUND OF THE INVENTION

Heretofore, various mechanical grippers for use with robotic tools or machines are well known. Such known grippers have been disclosed in various U.S. Pat. Nos. e.g. 4,593,948; 4,741,568; 4,874,194; 5,125,708; 5,163,729; 5,529,359; 5,572,915; 5,976,581 and 6,003,431. While these known grippers have proven to be useful for their intended purposes, certain problems persist, e.g. to provide a gripper assembly with a greater gripping force, or improving the accuracy thereof, and/or to provide for a more rugged and durable gripper assembly relative to the overall size of the gripper assembly, i.e. in keeping within the physical parameters of the known gripper assemblies.

SUMMARY OF THE INVENTION

An object of this invention is to provide a power gripper assembly particularly useful for handling relatively heavy loads relative to the overall size of the gripper.

Another object is to provide a gripper assembly in which the bearing forces imparted to the movable finger carriers are not imposed upon the synchronizing mechanism.

Another object is to provide a gripper assembly with a rugged and stable support for slidably supporting the finger carriers relative to the housing of the gripper assembly to enhance the durability and accuracy of the gripper assembly.

Another object is to enhance the gripping force of the gripper assembly relative to the given size thereof.

Another object is to provide a gripper assembly in which the synchronization arrangement is independent of the finger carrier support shafts and free of any bearing or frictional forces imparted on the support shafts.

As will be apparent herein, the above objects, features and other advantages are obtained by a gripper assembly that includes a housing having formed therein a pair of opposed cylinder chambers, each having a piston reciprocally mounted therein, and each pair of said cylinders being oppositely disposed and having their respective piston connected to a corresponding finger carrier slidably supported at the opposite ends of the housing. Each of the respective finger carriers is slidably supported on the housing by means of a pair of diagonally disposed support shafts. The equalized movement of the respective finger carriers relative to the housing is achieved by a synchronizing rack and pinion arrangement which is independent of the support shafts and free of the bearing forces imparted on the support shafts. This is attained by a rack connected to each of the respective finger carriers which is freely movable relative to the housing with each of the respective racks oppositely disposed and in meshing relationship with pinion or pinion wire. The arrangement is such that when the pinion is rotated in one direction, the finger carriers are moved in a synchronous manner toward an open position and when the pinion is rotated in the opposite direction, the finger carriers are moved in a synchronous manner toward a closed position. The respective pair of cylinders are cross-ported so that a fluid medium, e.g. compressed air, is simultaneously introduced into each of the respective cylinder chambers on one side of the piston therein to drive the associated finger carriers in one direction as the fluid medium is being exhausted from the other side of the respective pistons, and whereby the flow of fluid medium is reversed to drive the pistons and associated finger carriers in the opposite direction.

In a modified form of the invention, each of the respective finger carriers is provided with a pair of synchronizing racks which are oppositely disposed and in meshing relationship to a pinion or pinion wire.

IN THE DRAWINGS

DETAILED DESCRIPTION

Figure 1:
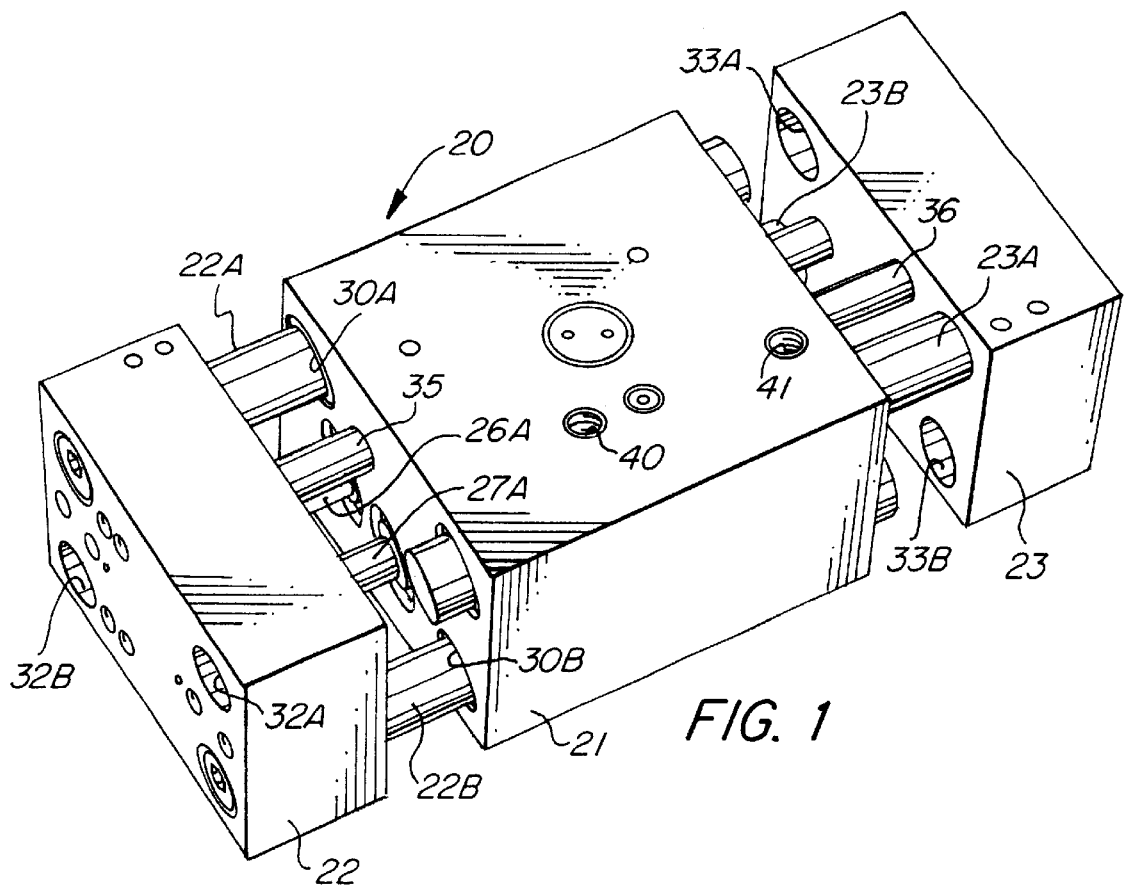
FIG. 1 is a perspective view of a gripper assembly embodying the invention.
Figure 2:
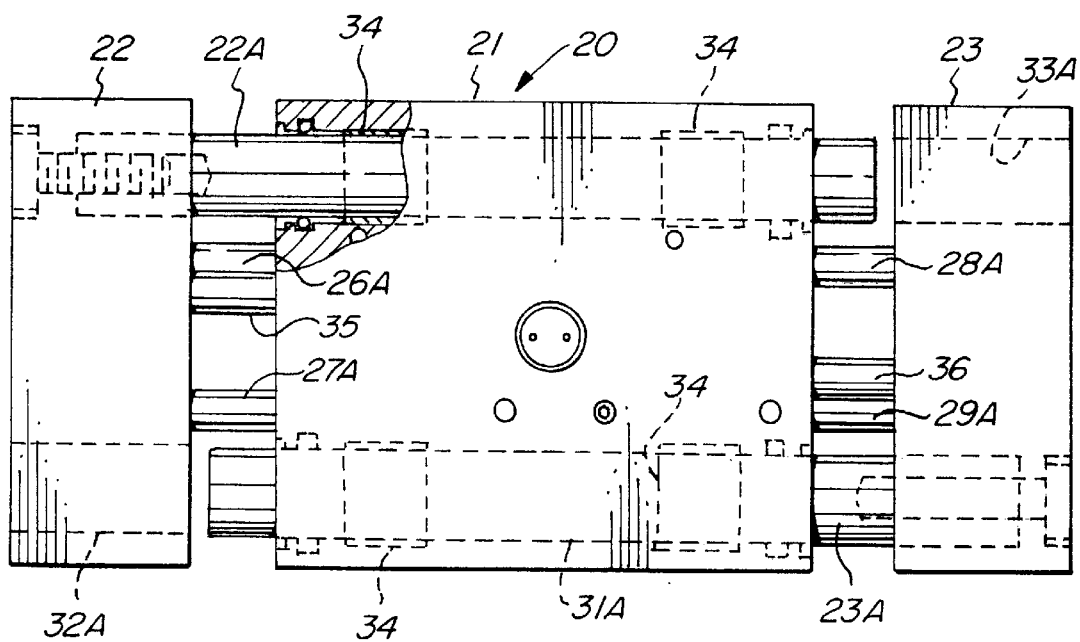
FIG. 2 is a top plan view of FIG. 1 having portions broken away.
Figure 3:
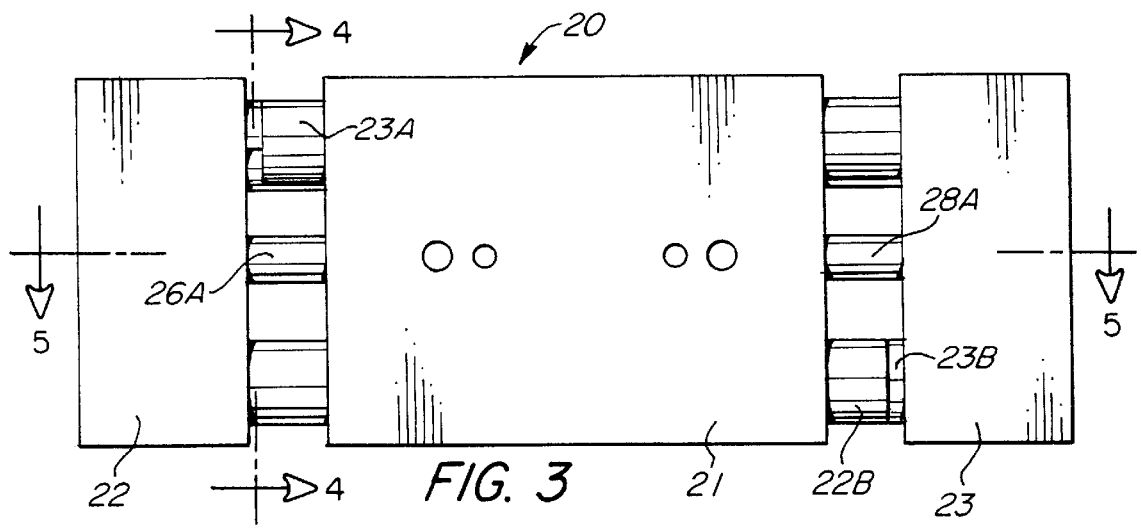
FIG. 3 is a side elevation view of FIG. 1.
Figure 4:
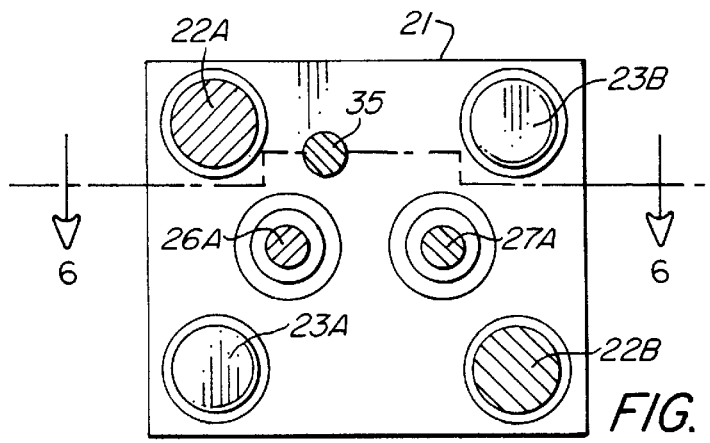
FIG. 4 is a sectional view taken along lines 4—4 on FIG. 3.

Referring to the drawings, there is illustrated in FIGS. 1 to 7 an embodiment of a gripper assembly 20 of the described invention. The disclosed gripper assemblies 20 and 50 relates to improvements in parallel type gripper assemblies having a housing containing a piston and cylinder drive means operatively connected to movable finger carriers which are synchronized for movement between open and closed position. U.S. Pat. No. 5,163,729 evidences a known class of a parallel gripper to which the present invention relates.

FIGS. 1 to 7 illustrate one embodiment of the present invention. As shown, the gripper assembly 20 comprises a housing 21 having slidably connected thereto oppositely disposed finger carriers 22, 23, associated therewith for movement between an opened and closed position. It will be understood that each of the carriers 22, 23 has connected thereto a gripping finger (not shown) for gripping a workpiece therebetween.

Figure 5:
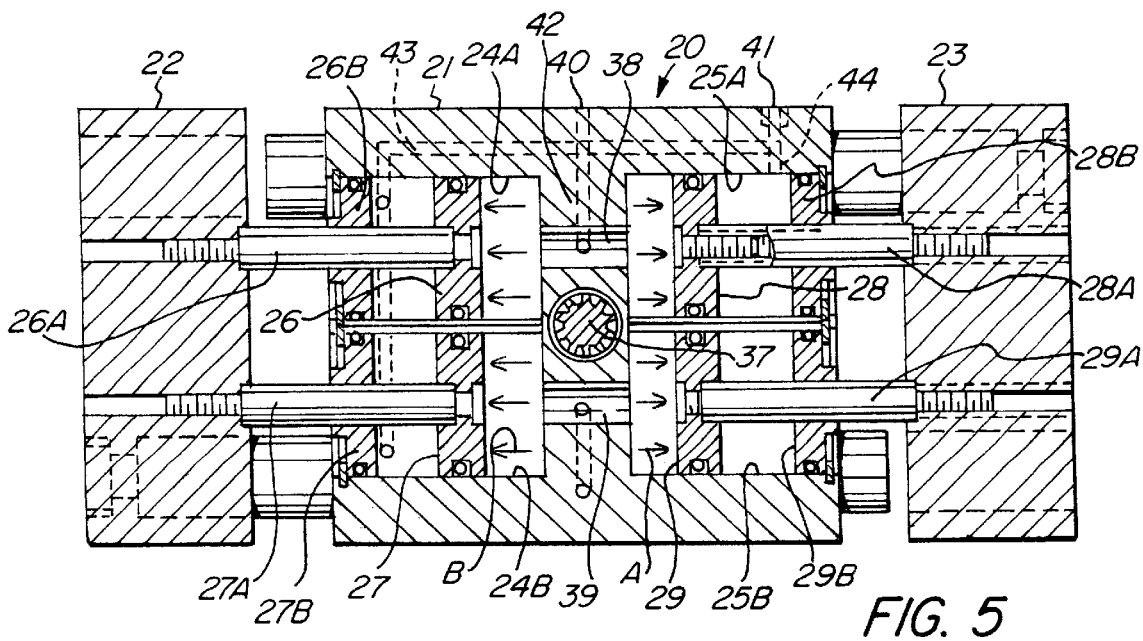
FIG. 5 is a sectional view taken along lines 5—5 on FIG. 3.

In accordance with this invention, the housing 21 is provided with two pairs of cylinder chambers 24A, 24B and 25A, 25B that are oppositely disposed. As best seen in FIG. 5, each pair of cylinder chambers 24A, 24B and 25A, 25B are disposed in side by side relationship. Displaceably disposed in each of the cylinder chambers 24A, 24B and 25A, 25B is a piston 26, 27 and 28, 29 respectively. A piston rod 26A, 27A, 28A, 29A is connected to each of the respective pistons 26, 27, 28 and 29.

In the illustrated embodiment, piston rods 26A, 27A extend through an end closure 26B, 27B of the respective cylinder chambers 24A, 24B. In a similar manner, piston rods 28A, 29A extend through end closures 28B and 29B of the respective cylinder chambers 25A, 25B. The extended ends of piston rods 26A, 27A are connected to finger carrier 22 and the extended ends of piston rods 28A, 29A are connected to finger carrier 23.

Figure 7:
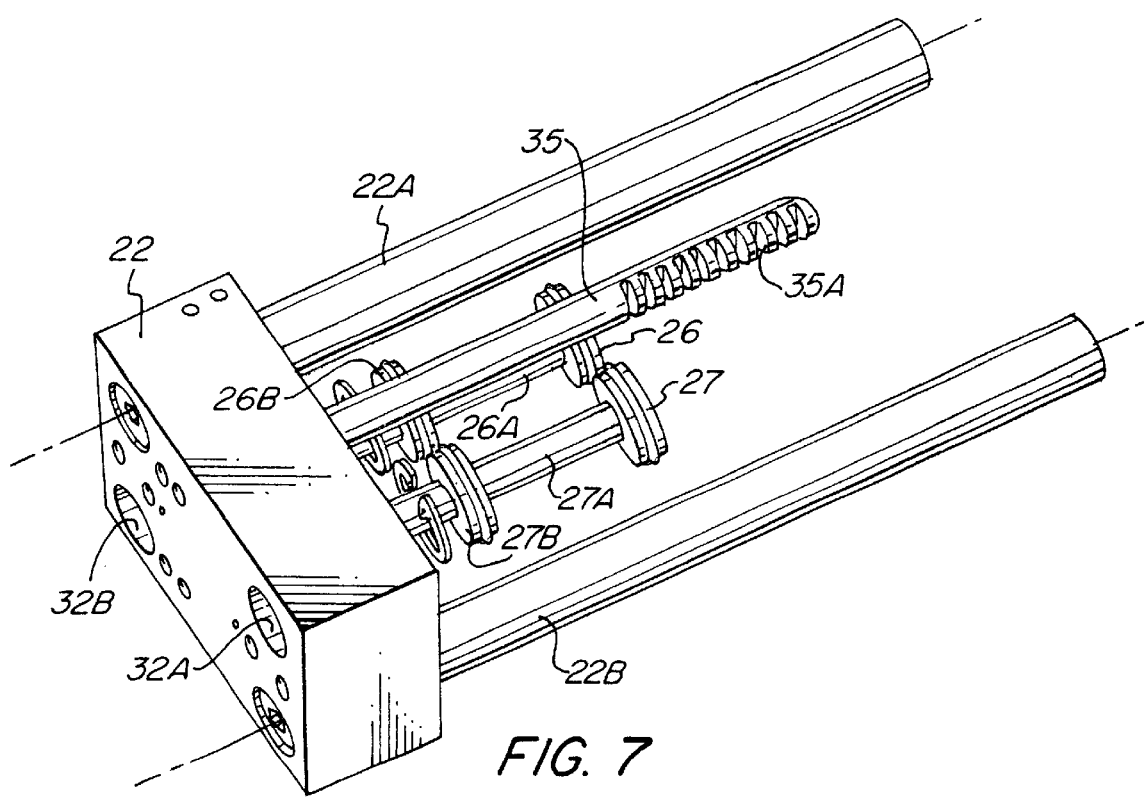
FIG. 7 is a perspective view of a finger carrier component of FIG. 1 with associated support shafts, connected pistons and synchronizing rack.
Figure 8:
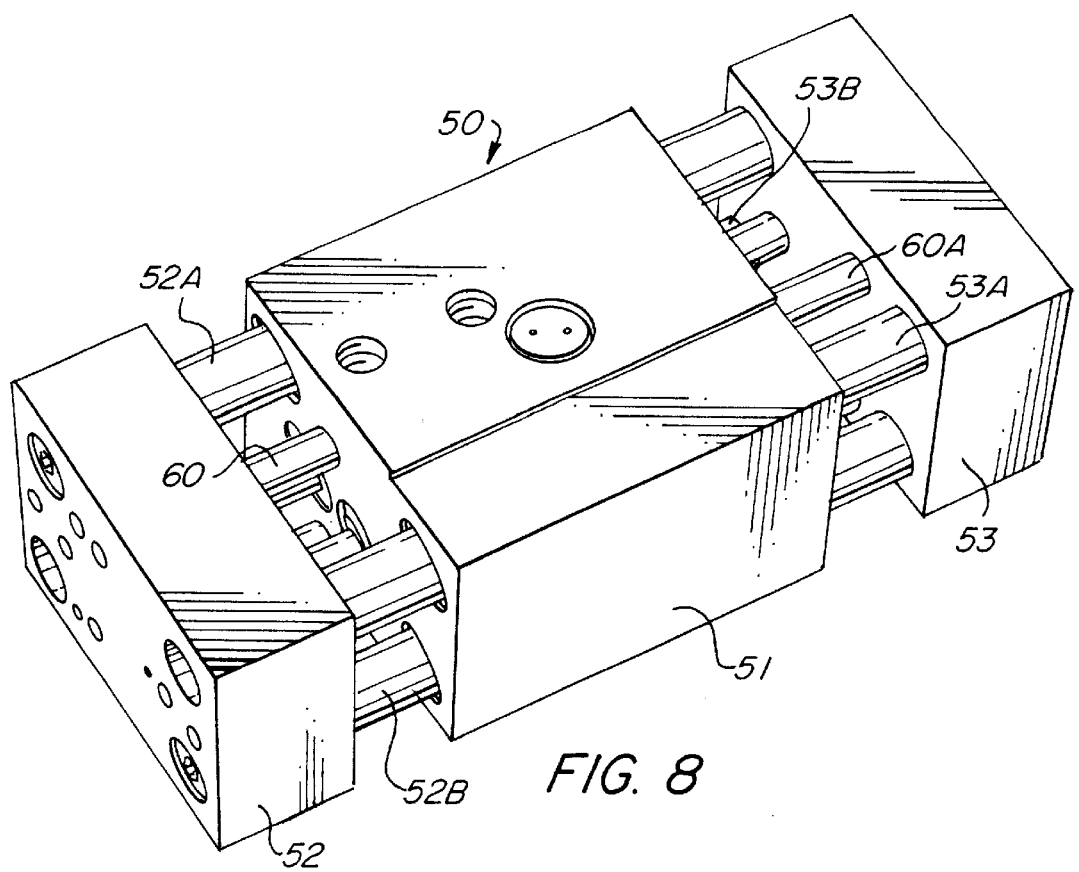
FIG. 8 is a perspective view of a modified embodiment.

As best seen in FIGS. 1 and 7, the respective finger carriers 22 and 23 are slidably mounted relative to the housing 21 by means of diagonally opposed support shafts 22A, 22B and support shafts 23A, 23B respectively. The housing 21 is thus provided with diagonally disposed bores 30A, 30B to slidably accommodate support shafts 22A and 22B respectively of finger carrier 22. Likewise, the housing 21 is also provided with diagonally opposed bores 31A, 31B to slidably accommodate support shafts 23A, 23B of finger carrier 23 respectively. The respective finger carriers 22 and 23 are also provided with diagonally opposed through holes 32A, 32B and 33A, 33B, respectively, for receiving the free end of the complementary diagonally disposed support shafts 22A, 22B and 23A, 23B when the respective finger carriers 22 and 23 are shifted toward the closed position. The respective support shafts 22A, 22B and 23A, 23B are slidably supported within their respective bores 30A, 30B and 31A, 31B by suitable bearings 34.

It will be noted that the finger carrier support shafts 22A, 22B and 23A, 23B are proportionately large. By connecting the shafts 22A, 22B and 23A, 23B diagonally relative to their respective finger carrier provides for a very stable support means in both lateral and vertical directions to minimize any flexing which results in enhancing the overall accuracy of the gripper assembly.

Figure 6:
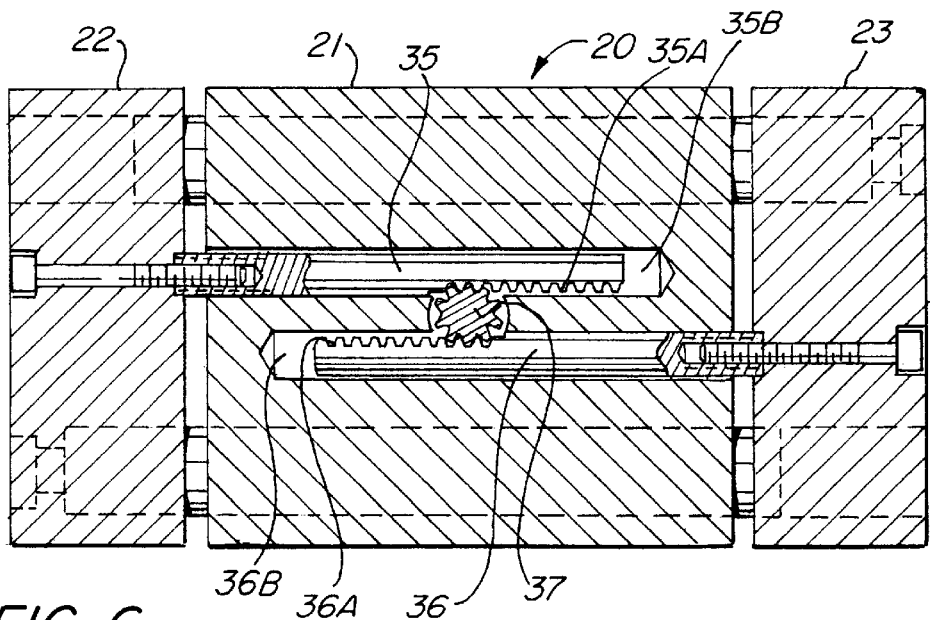
FIG. 6 is a sectional view taken along lines 6—6 on FIG. 4.

To insure that the respective finger carriers 22 and 23 move between open and closed positions in a uniform and synchronous manner, a synchronizing means is provided which is independent of the piston rods 26, 27; 28, 29 and the support shafts 22A, 22B and 23A, 23B. Referring to FIGS. 6 and 7, each of the respective finger carriers 22 and 23 is provided with a synchronizing shaft 35, 36 having a rack portion 35A, 36A connected thereto which are arranged to freely reciprocate within their respective complementary bores 35B and 36B formed in the housing 21 into and outwardly relative to the housing 21. As best seen in FIG. 6, the rack portions 35A, 36A of the respective shafts 35, 36 are oppositely disposed and in meshing relationship with a pinion or pinion wire 37. The arrangement is such that when the pinion 37 is driven in one direction, as will be herein described, the finger carriers are moved in one direction, e.g. toward an opening position in a synchronous manner, and when the pinion 37 is rotated in the opposite direction, the finger carriers are shifted toward the closed position in a synchronous manner.

Referring to FIG. 5, it will be noted that cylinder chambers 24A and 25A are connected into communication by means of a passageway 38. Cylinder chambers 24B and 25B are likewise in communication by means of passageway 39. In accordance with this invention, the pistons 26–29 are actuated by an actuating fluid medium, e.g. compressed air or hydraulics. As seen in FIGS. 1 and 5, the housing 21 is provided with air inlet-outlet ports 40 and 41 for introducing and/or exhausting the actuating fluid medium to effect piston displacement. Port 40 is connected to a branch passage 42 to direct the actuating fluid medium to passageway 38 and 39 to exert a fluid pressure onto the inner faces of the respective pistons 26–29, causing the respective piston to be simultaneously shifted in opposite directions as indicated by arrows A and B, whereby the respective finger carriers are shifted or moved toward an open position. Meanwhile, the fluid medium or air disposed on the other side of pistons 26–29 is ported to exhaust out through port 41 by means of branch passageways 43 and 44. When fluid medium is directed to port 41, the fluid medium is simultaneously introduced into the respective chambers 24A, 24B and 25A, 25B to exert a fluid pressure on the outer faces of the respective pistons 26–29 to drive the finger carriers toward the opposite or closed position, by the actuating medium flowing through branch passages 43 and 44. Meanwhile, the fluid medium on the opposite or inner face of the pistons 26–29 is exhausted to port 40. As the rack portions 35A and 36A, meshing with pinion 37, are connected to and driven by the displacement of the respective finger carriers, the respective finger carriers are synchronized in moving between open and closed positions.

From the foregoing, it will be apparent that the support shafts 22A, 22B and 23A, 23B, which are diagonally disposed, provides for a very stable rigid support by which any lateral or vertical displacement or play of the respective finger carriers is reduced to an absolute minimum or nil to result in enhanced accuracy by minimizing any play between the related parts during operation. Also, the double piston and cylinder arrangement enhances the power or force that is transmitted to the respective finger carriers and associated fingers (not shown) to result in a more positive or firm gripping of a workpiece therebetween. Thus, maximum force or power can be obtained by the dual piston and cylinder arrangement described per given size of the gripper assembly. The disclosed embodiment further discloses a synchronization means which is rendered independent of the support shafts to insure that forces acting on the support shafts are not transmitted to the synchronization means which comprise the racks 35A, 36A and pinion 37. Thus, any tendency of the synchronization means to wear or bind is reduced to an absolute minimum.

FIGS. 8 to 12 illustrate a modified embodiment of the invention. The gripper assembly 50, disclosed in the embodiment of FIGS. 8 to 12, is essentially similar to that described with respect to the embodiment disclosed and described in FIGS. 1 to 7. The gripper assembly 50 includes a housing 51 having formed therein two pair of opposed piston and cylinder arrangements similar to that of FIG. 5 with the finger carriers 52, 53 connected to the piston rods 56A, 57A of the opposed pair of piston and cylinder arrangement.

The respective finger carriers 52, 53 are slidably mounted on the housing 51 by diametrically opposed support shafts 52A, 52B and 53A, 53B as previously described.

Figure 9:
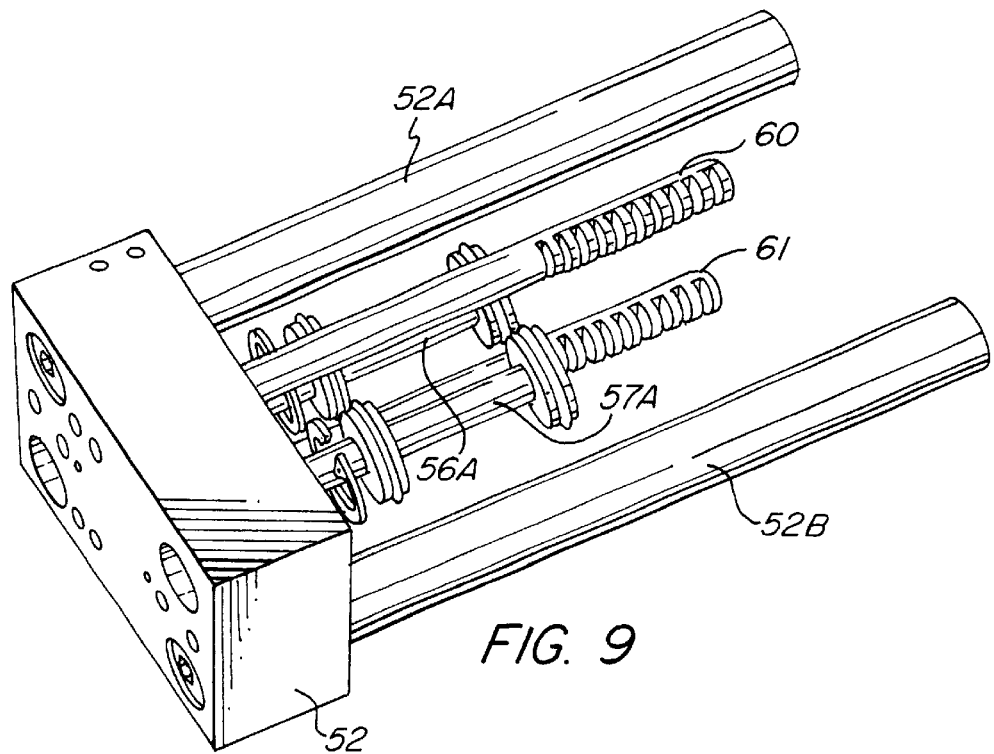
FIG. 9 is a perspective view of the finger component part of FIG. 8 with attached support shafts, piston rods and synchronizing rack.
Figure 10:
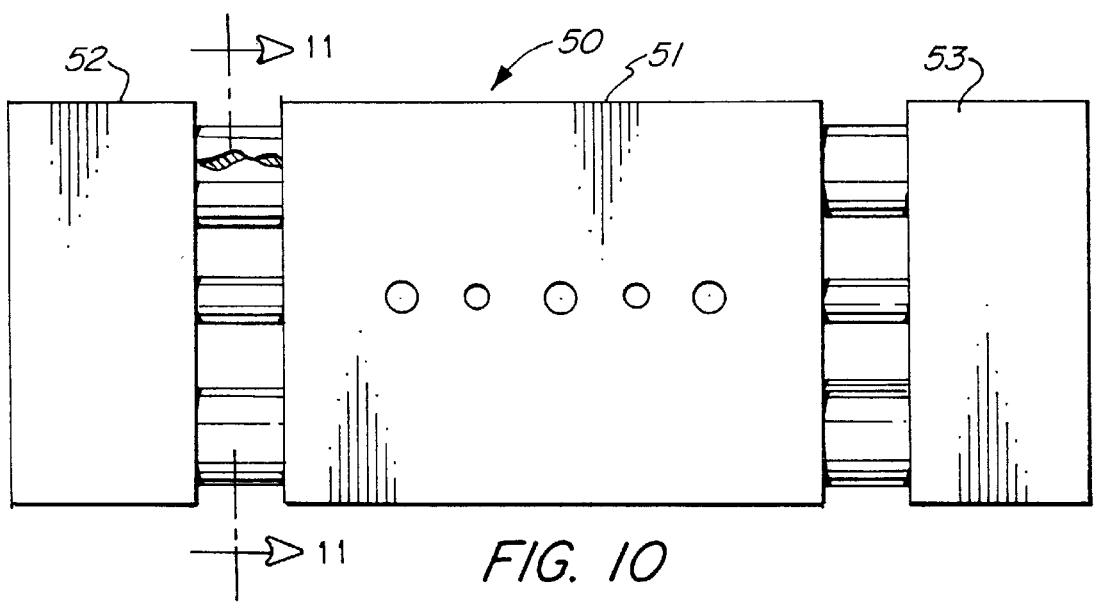
FIG. 10 is a side elevation view of FIG. 8.
Figure 11:
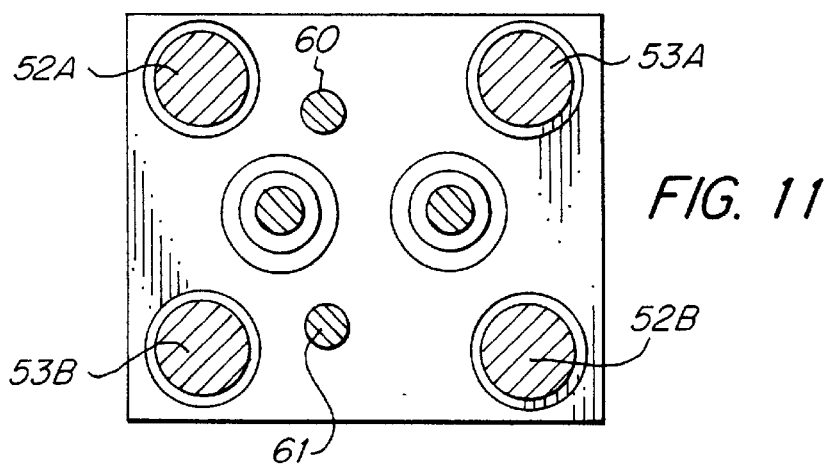
FIG. 11 is a sectional view taken along lines 11—11 on FIG. 10.
Figure 12:
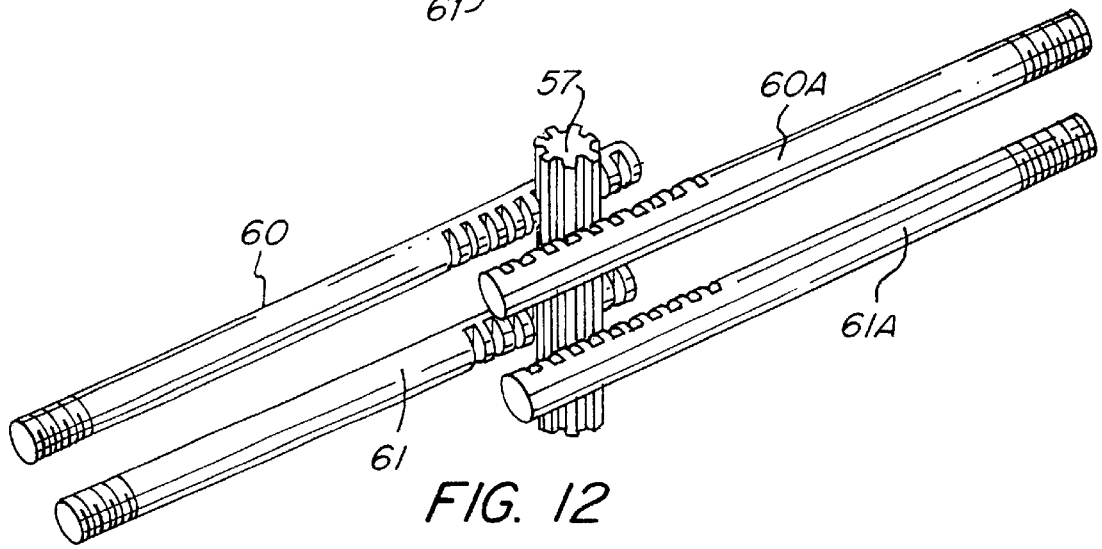
FIG. 12 is a perspective detail view of the synchronizing arrangement of the embodiment of FIG. 8.

The principal difference in the gripper assembly 50 resides in the synchronization means. As best seen in FIGS. 9 and 12, the synchronization means in gripper assembly 50 include a pair of spaced apart rack members 60, 61 and 60A, 61A, which are respectively connected to each of the finger carriers 52, 53. The arrangement of the synchronizing racks 60, 61 and 60A, 61A is such that they are oppositely disposed relative to the pinion 57 and in meshing relationship therewith as best seen in FIG. 12. This arrangement enhances the stabilization of the respective finger carriers. In all other respects, the gripper assembly 50 is similar to that described with respect to gripper assembly 20.

The respective arrangements described provide enhanced support for the respective finger carriers and associated fingers (not shown) connected thereto relative to the housing, whereby the tendency of the respective finger carriers to flex is minimized.

Also, in the respective embodiments described, the synchronizing racks 35 and 36 of FIGS. 1 to 7 and the pairs of synchronizing racks 60, 61 and 60A, 61A of FIGS. 8 to 12 are in free reciprocating relationship relative to the housing, as the synchronizing racks are independent of the means that provide the sliding support of the respective finger carriers, i.e. the diagonally disposed support shafts. Thus, there is no sliding friction or bearing forces imparted to the synchronizing shafts in the respective described embodiments, as the synchronizing shafts of the instant invention are freely movable relative to the housing. As the support shafts of the respective finger carriers are diagonally spaced, they are inherently further apart than the width of the housing to render the gripper assembly more stable with less tendency to impart any play or flexing of the finger carriers relative to the housing.

While the present invention has been described with respect to particular embodiments thereof, modifications and variations may be made without departing from the spirit or scope of this invention.

What is claimed is:

1. A power gripper assembly comprising:
   a housing having opposed ends,
   opposed finger carriers mounted on said housing on the opposed ends of said housing,
   a pair of diagonally opposed support shafts, each of the support shafts slidably supporting said finger carrier on said housing
   a drive means for reciprocating said finger carriers between and open and closed position,
   said drive means including two pair of cylinder chambers wherein one pair of said cylinder chambers is oppositely disposed relative to the other of said pair of cylinder chambers,
   a piston displaceably disposed within each of said cylinder chambers,
   a piston rod independent from said support shaft connected to each of said pistons,
   said piston rods having a free end, said free end of said piston rods of said one pair cylinder chambers being connected to one of said finger carriers, and the free ends of said piston rods of said other pair of cylinder chambers being connected to the other of said finger carriers,
   and a synchronizing means including a synchronizing shaft having a rack portion connected to each of said fingers and a pinion disposed in meshing relationship with said rack portions of said synchronizing shafts.

2. A power gripper assembly comprising:
   a housing having opposed ends,
   a finger carrier slidably mounted on said housing adjacent an opposed end of said housing,
   a drive means for reciprocating said finger carriers between and open and closed position,
   said drive means including two pair of cylinder chambers wherein one pair of said cylinder chambers is oppositely disposed relative to the other of said pair of cylinder chambers,
   a piston displaceably disposed within each of said cylinder chambers,
   a piston rod connected to each of said pistons,
   said piston rods having a free end, said free end of said piston rods of said one pair cylinder chambers being connected to one of said finger carriers, and the free ends of said piston rods of said other pair of cylinder chambers being connected to the other of said finger carriers,
   and including a means for synchronizing the movement of said finger carriers between open and closed positions,
   said synchronizing means includes a synchronizing shaft having a rack portion connected to each of said finger carriers,
   a pinion disposed within said housing,
   each said synchronizing shaft having its respective rack portion disposed in meshing relationship with said pinion for synchronizing the movement of said finger carriers between open and closed positions,
   and including diagonally opposed support shafts connected to each of said finger carriers,
   said diagonally opposed support shafts of said finger carriers being slidably mounted relative to said housings.

3. A power gripper assembly as defined in claim 2 wherein said synchronizing means includes single synchronization shaft connected to each of said finger carriers,
   each of said synchronizing shafts being independent of said support shafts and freely slidable relative to said housing as said finger carriers reciprocate between open and closed positions.

4. A power gripper assembly as defined in claim 2 wherein said synchronization means includes
   a pair of spaced apart synchronization shafts connected to each of said finger carriers,
   said pairs of synchronizing shafts each having a rack portion,
   the rack portions of said respective pair of synchronization shafts being oppositely disposed and laterally spaced,
   and a pinion disposed in meshing relationship with respect to said rack portion of said respective synchronizing shafts.

5. A power gripper assembly comprising:
   a housing having opposed ends,
   a finger carrier on each of said opposed ends,
   each of said finger carrier having a pair of diagonally disposed support shafts connected thereto,
   said support shafts of each of said finger carrier being reciprocally mounted on said housing for slidably supporting its connected finger carrier on said housing,
   a drive means in said housing for effecting the drive of said finger carriers between open and closed positions,
   said drive means including
   two pair of cylinder chambers disposed within said housing,
   one pair of said cylinder chambers being oppositely disposed relative to the other pair of said two pair of cylinder chambers,
   a piston displaceably disposed within each of said cylinder chambers,
   a piston rod connected to each of said pistons,
   said piston rods of said one pair of cylinder chambers being connected to one of said finger carriers, and
   said piston rods of said other pair of said cylinder chambers being connected to the other finger carrier,
   and synchronizing means independent of said support shafts and piston rods for synchronizing the movement of said finger carriers between open and closed positions, said synchronization means including a synchronization shaft connected to each of said finger carriers, whereby said synchronization shafts are freely reciprocal relative to said housing, said synchronization shaft connected to one of said finger carriers being laterally offset relative to the synchronization shaft connected to the other finger carrier, and a pinion disposed within said housing between and in meshing relationship with said laterally spaced synchronization shafts.

6. A power gripper assembly for use with robotic tools comprising:

a housing having opposed ends, a finger carrier mounted on each of said opposed ends of said housing for movement between an open and closed position, means for slidably supporting said finger carrier relative to said housing, said slidably support means including a pair of diagonally opposed support shafts connected to said finger carrier, said diagonally opposed support shafts being slidably mounted on said housing for reciprocation between and open and closed position, a drive means for effecting the reciprocation of said finger carriers, said drive means including two pair of cylinder chambers formed in said housing, one pair of said cylinder chambers being oppositely disposed relative to the other pair of said two pair of cylinder chambers, a piston displaceably disposed in each of said cylinder chambers, an independent piston rod connected to each of said pistons, said piston rod connected to said piston of said one pair of said cylinder chambers being connected to one of said finger carriers, and said piston rod connected to said piston of said other pair of said cylinder chambers being connected to the other of said finger carriers, means connecting one of said pair of said cylinder chamber in communication with one of said other pair of said cylinder chamber, fluid passageway for directing a fluid pressure into each of said cylinder chambers for effecting displacement of said respective piston to effect the drive of said finger carriers between open and closed position, and means for synchronizing the movement of said finger carriers between open and closed position, said synchronizing means including at least one synchronizing shaft independent of said support shaft and piston rods connected to each of said finger carriers, said synchronizing shaft connected to one of said finger carriers being offset relative to the synchronizing shaft connected to the other of said finger carrier, said respective synchronizing shafts having an opposed rack portion, a pinion disposed in meshing relationship with the opposed rack portion of said synchronization shafts, and said synchronization shafts being free to reciprocate within said housing free of any sliding friction occurring between said housing and said synchronizing shafts.

7. A power gripper assembly as defined in claim 6 wherein only a single synchronizing shaft is connected to each of said finger carriers.

8. A power gripper assembly as defined in claim 6 wherein a pair of spaced apart synchronizing shafts are connected to each of said finger carriers, whereby said pair of synchronizing shafts connected to one of said finger carriers are laterally spaced from said pair of synchronizing shafts connected to said other finger carrier.

* * * * *